US012586492B2

(12) United States Patent
Ko

(10) Patent No.: US 12,586,492 B2
(45) Date of Patent: Mar. 24, 2026

(54) ELECTRONIC DEVICE AND METHOD PROVIDING 3-DIMENSION IMAGE

(71) Applicant: THINKWARE CORPORATION, Seongnam-si (KR)

(72) Inventor: Sukpil Ko, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 18/651,709

(22) Filed: May 1, 2024

(65) Prior Publication Data

US 2024/0371304 A1 Nov. 7, 2024

(30) Foreign Application Priority Data

May 2, 2023 (KR) ........................ 10-2023-0056913
Apr. 5, 2024 (KR) ........................ 10-2024-0047001

(51) Int. Cl.
| | |
|---|---|
| *G09G 3/00* | (2006.01) |
| *G02B 27/00* | (2006.01) |
| *G02B 27/01* | (2006.01) |
| *G06F 3/01* | (2006.01) |
| *G09G 3/3208* | (2016.01) |

(52) U.S. Cl.
CPC ......... *G09G 3/001* (2013.01); *G02B 27/0093* (2013.01); *G02B 27/0101* (2013.01); *G02B 27/0179* (2013.01); *G06F 3/013* (2013.01); *G09G 3/3208* (2013.01); *G02B 2027/0134* (2013.01); *G02B 2027/0185* (2013.01); *G02B 2027/0187* (2013.01); *G09G 2354/00* (2013.01); *G09G 2380/10* (2013.01)

(58) Field of Classification Search
CPC .............. G02B 27/0093; G02B 27/01; G02B 27/0101; G02B 27/0179; G02B 2027/0134; G02B 2027/0185; G02B 2027/0187; G06F 3/013; G09G 3/001; G09G 3/3208; G09G 2354/00; G09G 2380/10
See application file for complete search history.

(56) References Cited

U.S. PATENT DOCUMENTS

| | | | | |
|---|---|---|---|---|
| 2018/0003972 A1* | 1/2018 | Kress | .................. | G02B 27/0172 |
| 2018/0196509 A1* | 7/2018 | Trail | .................. | G02B 27/0172 |
| 2019/0187482 A1* | 6/2019 | Lanman | ............... | G02B 26/105 |
| 2021/0117695 A1* | 4/2021 | Salter | ................ | B32B 17/10761 |
| 2021/0152812 A1* | 5/2021 | Ota | .................... | G02B 27/0179 |
| 2022/0247982 A1* | 8/2022 | Kroll | .................... | G02B 26/101 |

* cited by examiner

*Primary Examiner* — Cory A Almeida
(74) *Attorney, Agent, or Firm* — ZION IP; Byungwoong Park

(57) ABSTRACT

An electronic device includes a first light emitting module, a second light emitting module, a screen configured to provide to a user a first image emitted from the first light emitting module and a second image emitted from the second light emitting module, and an eye tracker configured to detect a position of eyes of the user. The first light emitting module and the second light emitting module are configured to adjust a focal length between the eyes of the user and an image identifiable by the user, corresponding to the position of eyes of the user detected by the eye tracker, based on a binocular parallax between a visual object in the first image and a visual object in the second image.

18 Claims, 8 Drawing Sheets

601

IDENTIFY A POSITION OF EYES OF A USER (OR DRIVER)

603

CONTROL A FIRST LIGHT EMITTING ELEMENT AND A SECOND LIGHT EMITTING ELEMENT

ELECTRONIC DEVICE AND METHOD PROVIDING 3-DIMENSION IMAGE

CROSS-REFERENCE TO RELATED APPLICATION(S)

This application is based on and claims priority under 35 U.S.C. § 119 to Korean Patent Application No. 10-2023-0056913, filed on May 2, 2023, and Korean Patent Application No. 10-2024-0047001, filed on Apr. 5, 2024, in the Korean Intellectual Property Office, the disclosure of each of which is incorporated by reference herein in its entirety.

BACKGROUND

Technical Field

The present disclosure relates to an electronic device and a method for providing a 3-dimension image.

Description of Related Art

While a driver is driving, various electronic devices are being developed to obtain information about the vehicle while keeping an eye on its driving environment ahead. For example, in case where a head-up display is installed in a vehicle, a driver may obtain such vehicle information without checking a dashboard of the vehicle. The head-up display mounted on the vehicle may provide various visual information to the driver, using light reflected from windshield glass of the vehicle.

SUMMARY

While a vehicle is being driven, a driver usually keeps an eye on the environment ahead. When the driver shifts his or her gaze to check navigation information or information from a dashboard of the vehicle while watching the environment ahead, the driving stability of the vehicle may be impaired. Further, in case where the driver adjusts his or her eye focus from looking at the relatively distant environment ahead to recognizing visual information displayed by a display device inside the vehicle, the driver's eye strain may increase. To address this problem, there is a need for a solution to facilitate the driver to easily recognize the visual information necessary while driving the vehicle.

The technical problems to be solved in the present disclosure are not limited to those described above, and other technical problems not mentioned herein may be clearly understood by those skilled in the art from the following description.

According to an embodiment, an electronic device may include a first light emitting module, a second light emitting module, a screen configured to provide a user with a first image using light emitted from the first light emitting module and a second image using light emitted from the second light emitting module, and an eye tracker configured to detect a position of eyes of the user. The first light emitting module and the second light emitting module may be configured to adjust a focal length between the position of eyes of the user detected by the eye tracker and an image identifiable by the user, based on a binocular parallax between a visual object in the first image and a visual object in the second image.

According to an embodiment, a method of an electronic device may include identifying a position of eyes of a driver in a vehicle, emitting light toward a front windshield of the vehicle through a first light emitting module to transmit a first image toward a first eye of the driver, emitting light toward the front windshield of the vehicle through a second light emitting module to transmit a second image toward a second eye of the driver, and controlling a posture of the first light emitting module and the second light emitting module based on the identified position of eyes of the driver. A focus of image information reflected by the front windshield of the vehicle may be adjusted by a binocular parallax between a first virtual object in the first image and a second virtual object in the second image.

According to an embodiment, provided is a non-transitory computer-readable storage medium storing one or more programs, wherein the one or more programs may include instructions that, when executed by an electronic device, cause the electronic device to identify a position of eyes of a driver in a vehicle. The one or more programs may include instructions that, when executed by the electronic device, cause the electronic device to emit light toward a front windshield of the vehicle through a first light emitting module to transmit a first image toward a first eye of the driver. The one or more programs may include instructions that, when executed by the electronic device, cause the electronic device to emit light toward the front windshield of the vehicle through a second light emitting module to transmit a second image toward a second eye of the driver. The one or more programs may include instructions that, when executed by the electronic device, cause the electronic device to control a posture of the first light emitting module and the second light emitting module based on the identified position of eyes of the driver. A focus of image information reflected by the front windshield of the vehicle may be adjusted by a binocular parallax between a first virtual object in the first image and a second virtual object in the second image.

According to an embodiment, an electronic device and a method for providing a 3D image may provide visual information within a field of view of a driver while the driver is looking forward.

According to an embodiment, an electronic device and a method of providing a three-dimensional image may reduce the user's eye fatigue by displaying visual information at a position corresponding to an external object that the driver is gazing at.

The effects that may be obtained from the disclosure are not limited to those described above, and other effects not mentioned herein may be clearly understood by those skilled in the art from the following description.

BRIEF DESCRIPTION OF THE DRAWINGS

The above and other aspects, features, and advantages of certain embodiments of the disclosure will be more apparent from the following description, taken in conjunction with the accompanying, in which.

DETAILED DESCRIPTION

Figure 1:
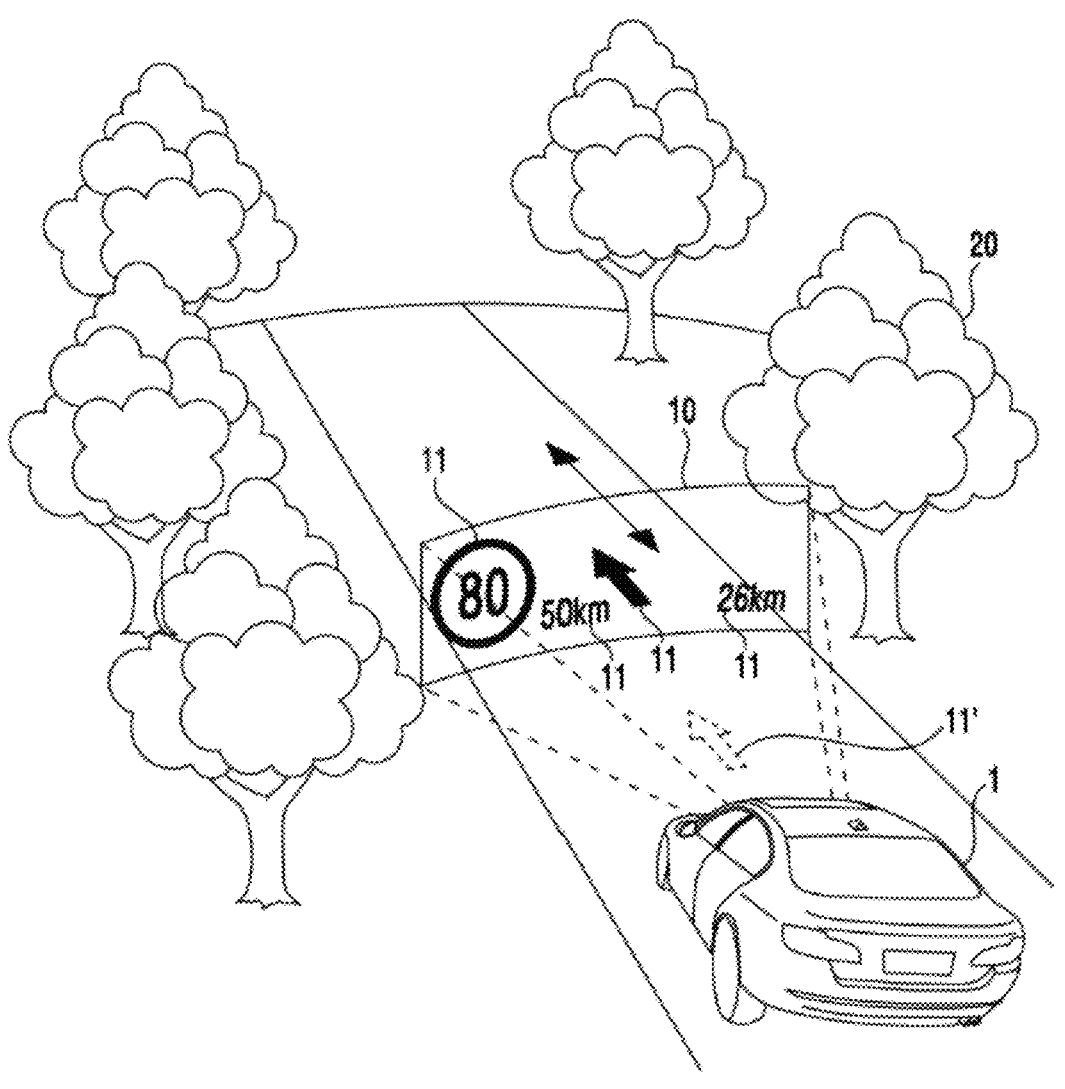
FIG. 1 illustrates an example of providing vehicle information provided through an electronic device mounted on a vehicle.

An electronic device according to various embodiments disclosed herein may be one of various types of electronic devices. The electronic devices may include, for example, a portable communication device (e.g., a smartphone), an electronic device controlled by a portable communication device, a computer device, a portable multimedia device, a camera, an electronic device, or an electronic device mounted inside a vehicle. The electronic devices according to an embodiment of the present disclosure are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to description of the drawings, similar reference numerals may be used to refer to similar or related elements. It is to be understood that a singular form of a noun corresponding to an item may include one or more of those items, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with (to)" or "connected with (to)" another element (e.g., a second element), it means that the element may be coupled with the other element directly (e.g., wiredly), wirelessly, or via a third element.

Various embodiments of the present disclosure as set forth herein may be implemented as software (e.g., a program) including one or more instructions that are stored in a storage medium (e.g., an internal memory or an external memory) that is readable by a machine. For example, a processor of the machine may invoke at least one of the one or more instructions stored in the storage medium, and execute the same. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an embodiment, a method according to various embodiments of the disclosure may be included and provided in a computer program product. The computer program product may be traded as a commodity between a seller and a buyer. The computer program product may be distributed in the form of a machine-readable storage medium (e.g., a compact disc read only memory (CD-ROM)), or may be distributed (e.g., downloaded or uploaded) online via an application store, or between two user devices (e.g., smart phones, electronic devices within vehicles, etc.) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, embodiments of the disclosure will be described in greater detail with reference to the accompanying drawings such that those skilled in the art to which the disclosure pertains may easily practice the same. However, the disclosure may be implemented in various different forms and is not limited to the embodiments described herein. With regard to the description of the drawings, the same or similar reference numerals may be used for the same or similar components. Further, in the drawings and their related descriptions, descriptions of well-known functions and configurations may be omitted for clarity and brevity.

Figure 2:
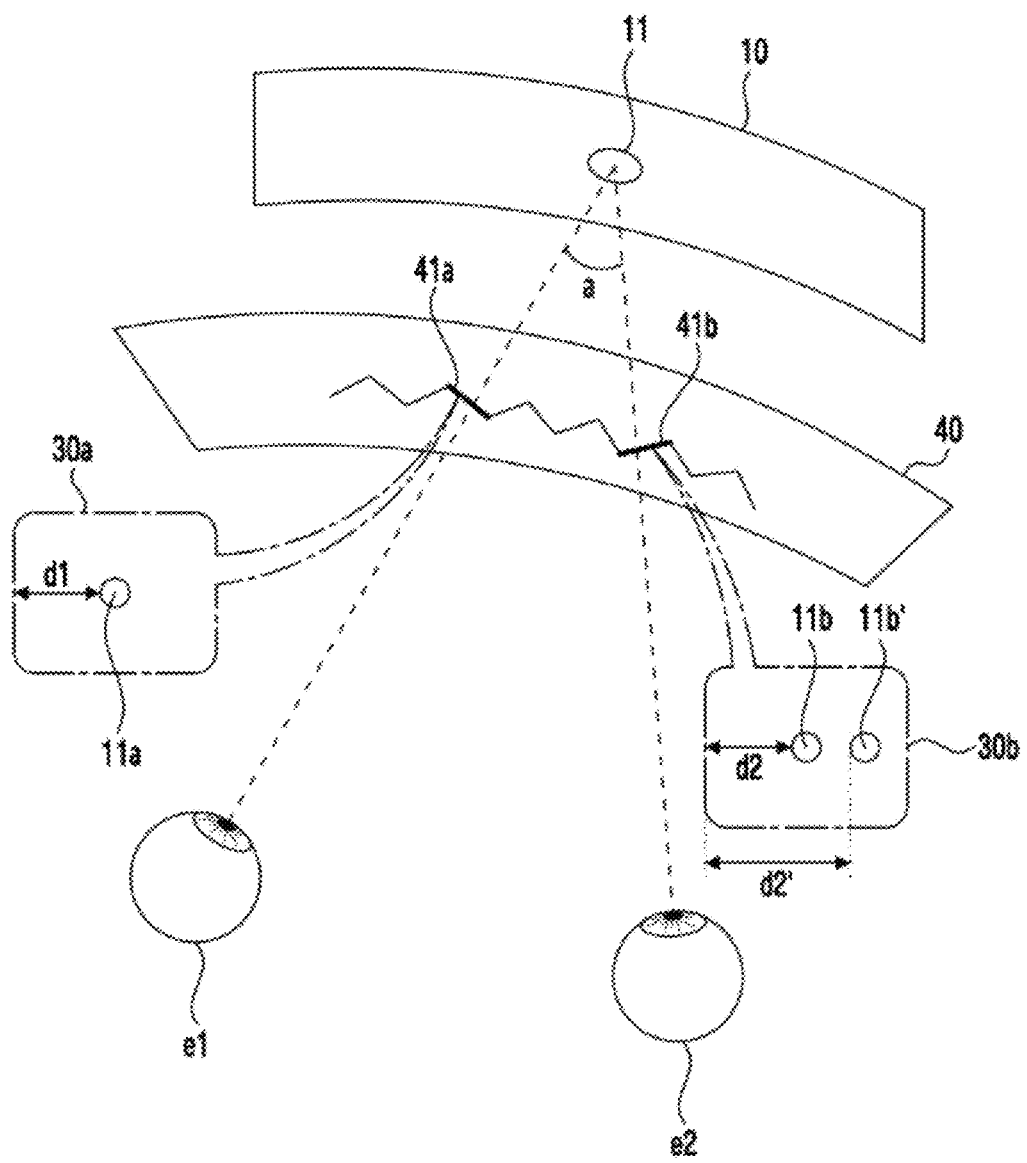
FIG. 2 illustrates an example of a three-dimensional representation of vehicle information through an electronic device.

FIG. 1 illustrates an example of providing vehicle information provided through an electronic device mounted on a vehicle. FIG. 2 illustrates an example of a three-dimensional representation of vehicle information through an electronic device.

Referring to FIG. 1, a vehicle 1 or an electronic device (e.g., an electronic device 100 of FIG. 3A or an electronic device 200 of FIG. 4A) mounted on the vehicle 1 may provide a driver (or user) with visual information for of the vehicle 1, while the vehicle 1 is driving. The vehicle 1 or the electronic device mounted on the vehicle 1 may provide visual information to the driver through a dashboard of the vehicle or a display mounted inside the vehicle. The vehicle 1 or the electronic device mounted on the vehicle 1 may provide visual information to the user through a display (e.g., a head up display (HUD)) configured to be reflected by a windshield (or front glass) of the vehicle.

According to an embodiment, the vehicle 1 or the electronic device mounted on the vehicle 1 may be configured to provide three-dimensional visual information presented through the HUD. For example, the visual information presented through the HUD may have perspective. While driving the vehicle, the driver may need to change the focus of his/her eyes to view visual information displayed on the windshield through the HUD, a dashboard, or an interior display. For example, the drivers may find it difficult to react to an emergency or may feel an increase in eye strain as they change their fields of view or eye focusing from looking at an external object 20 of the vehicle 1 (e.g., roadway, vehicles, or background) to checking visual information of the vehicle.

According to an embodiment, the vehicle 1 or the electronic device mounted on the vehicle 1 may be configured to adjust the position of display of visual information provided through the HUD. The vehicle 1 or the electronic device mounted on the vehicle 1 may display a visual object 11 on a virtual screen 10. The visual object 11 may include image information or an icon selected from at least one of e.g., driving direction, driving distance, remaining distance, travelling route, driving speed, information on surrounding location, or a combination thereof. A focal distance between a visual object 11' displayed at a fixed position and the driver's eyes may be different from a focal length between the external object 20 being watched by the driver and the driver's eyes. In order to identify the visual object 11' displayed at the fixed position, the driver may experience difficulty in identifying the surrounding environment and increased eye strain as the driver changes to the focal length corresponding to the visual object 11' displayed at the fixed position. According to an embodiment, the vehicle 1 or the electronic device mounted on the vehicle 1 may be configured to adjust the position of the virtual screen 10 on which the visual object 11 is displayed, in order to maintain the focal length of the driver to reduce eye strain. For example, the vehicle 1 or the electronic device mounted on the vehicle 1, when identifying that the driver of the vehicle 1 gazes at the external object 20, may adjust such that the virtual screen 10, on which the visual object 11 is displayed, is positioned at a point corresponding to the focal length between the external object 20 and the eyes of the driver of the vehicle 1. Referring to FIG. 2, a method of displaying perspective of the visual object displayed on the virtual screen 10 will be described.

Referring to FIG. 2, the vehicle 1 or the electronic device disposed in the vehicle 1 may include a screen 40 that is disposed in front of a driver of the vehicle 1. The screen 40 may function as a part of the windshield of the vehicle. The screen 40 disposed on the windshield may serve as a component of the HUD that provides the visual object 11 to the user. Although it is described that the screen 40 functions as a part of the windshield of the vehicle 1, the embodiment is not limited thereto. For example, the screen 40 may be disposed or mounted onto a component including transparent glass or a transparent polymer disposed between the windshield of the vehicle 1 and the driver. An example of the structure of the electronic device including the screen 40 will be described with reference to FIGS. 3A, 3B, 4A, and 4B.

According to an embodiment, the screen 40 may execute a function related to augmented reality (AR) and/or mixed reality (MR). With the driver is in the vehicle 1, the screen 40 disposed or mounted on the windshield (or front glass) may combine visible light representative of the surrounding environment that has penetrated the windshield (or front glass) and the light emitted through the screen 40. As the screen 40 combines the light, the driver may view a mixed image of the surrounding environment including the external object of the vehicle and the visual object 11 formed by the light emitted through the screen 40. The image of the visual object 11 may be displayed on a virtual screen 10 disposed outside the vehicle 1.

According to an embodiment, the screen 40 may include at least one light emitting module (41a, 41b) arranged toward each of the user's eyes (e1, e2). The screen 40 may include a first light emitting module 41a and a second light emitting module 41b. The light emitting elements of the first light emitting module 41a may be arranged to face the first eye e1 of the driver in the vehicle 1 (e.g., the left eye of the driver), and the light emitting elements of the second light emitting module 41b may be arranged to face the second eye e2 of the driver in the vehicle 1 (e.g., the right eye of the driver).

The vehicle 1 or the electronic device including the screen 40 may provide a virtual screen 10. The screen 40, or the vehicle 1 or the electronic device including the screen 40 may display the visual object 11 having a three-dimensional position in the virtual screen 10. The screen 40 may change the distance of the visual object 11 within the virtual screen 10 recognized by the user, by changing a first position of a visual object 11a within a first image 30a provided through the light emitting modules of the first light emitting module 41a and a second position of a visual object 11b within a second image 30b provided through the light emitting modules of the second light emitting module 41b. For example, the screen 40, or the vehicle 1 or the electronic device including the screen 40 may adjust perspective of the visual object 11 in the virtual screen 10 by adjusting a difference between the first position and the second position. As the difference between the first position and the second position increases, the binocular parallax (a) of the visual object 11 may increase. As the binocular parallax (a) increases, the screen 40 may provide a sense in which the visual object 11 within the virtual screen 10 approaches. For example, the visual object 11a in the first image 30a may be located at the first position, and the visual object 11b in the second image 30b may be located at the second position. The visual object 11a and the visual object 11b may represent objects corresponding to each other. When the first position of the visual object 11a within the first image 30a is located at the distance d1 from one point of the first image 30a, and when the second position of the visual object 11b within the second image 30b is located at the distance d2 from one point of the second image 30b, the screen 40 may display the visual object 11 as being disposed on a surface of the virtual screen 10. When the second position of the visual object 11b in the second image 30b is moved to the visual object 11b', in order to adjust the perspective of the visual object 11, the position of the visual object 11b' may be a point that is located at a distance d2' from one point of the second image 30b. The binocular parallax (a) may be increased by the moved visual object 11b' in the second image 30b, and due to the increased binocular parallax (a), the screen 40 may cause the user to perceive the visual object 11 as approaching from the virtual screen 10.

As the difference between the first position and the second position decreases, the binocular parallax (a) of the visual object 11 may decrease. As the binocular parallax (a) decreases, the screen 40 may provide a sense in which the visual object 11 in the virtual screen 10 moves away. For example, the visual object 11a in the first image 30a may be located at the first position, and the visual object 11b' in the second image 30b may be located at a position different from the second position. In order to adjust perspective of the visual object 11, when the position of the visual object 11b' in the second image 30*b* is moved to the second position of the visual object 11*b*, the position of the visual object 11*b* may be a point that is located at a distance d2 from one point of the second image 30*b*. The binocular parallax (a) may be reduced by the visual object 11*b* within the shifted second image 30*b*, and due to the reduced binocular parallax (a), the screen 40 may cause the user to perceive the visual object 11 as moving away from the virtual screen 10.

Figure 3A:
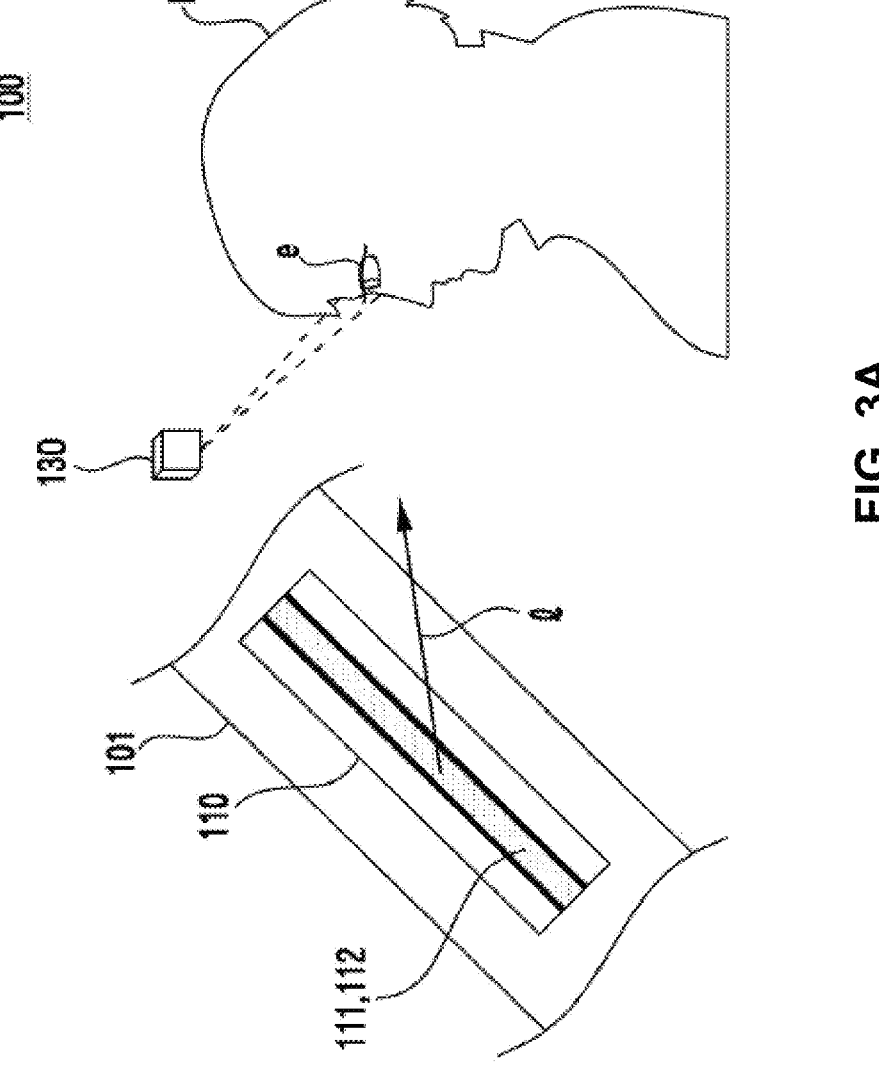
FIG. 3A illustrates an arrangement of components of an example electronic device.
Figure 4A:
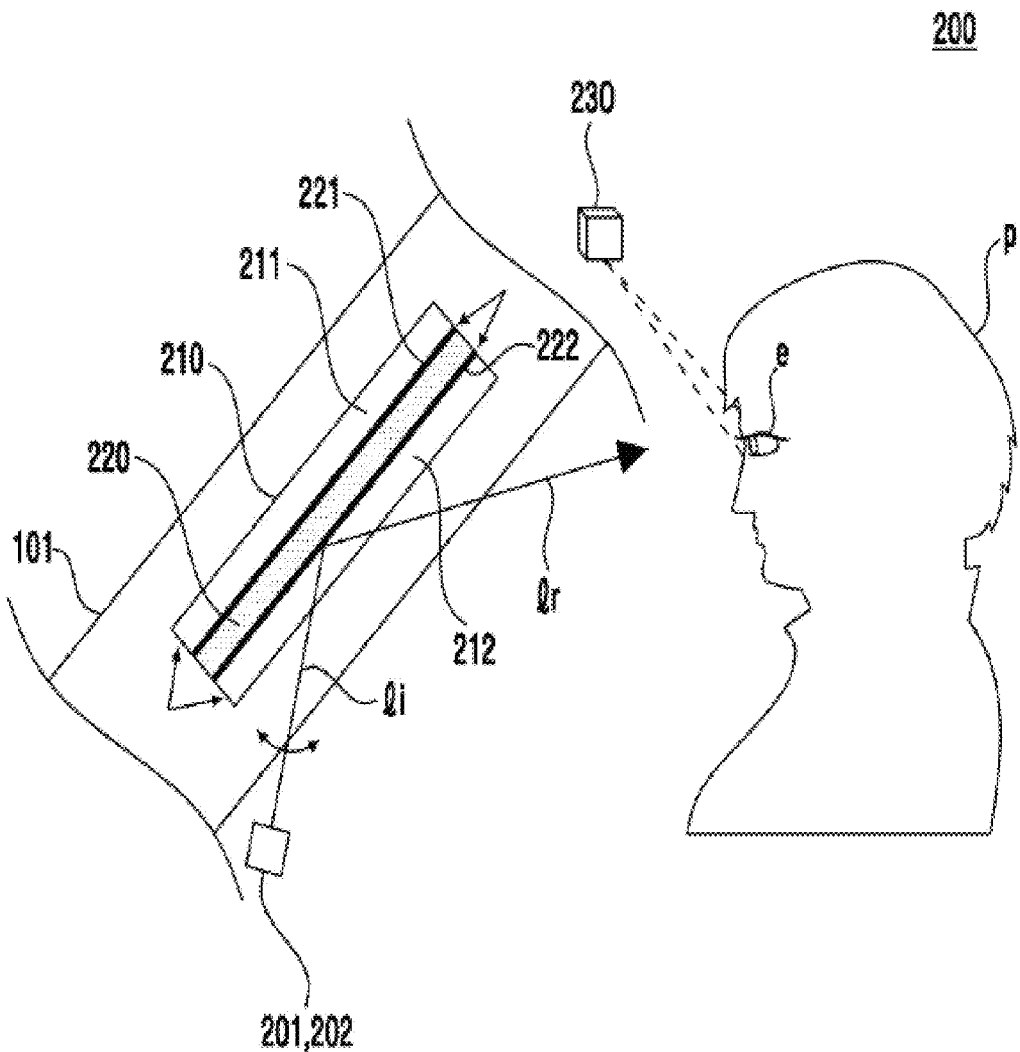
FIG. 4A illustrates an arrangement of components of an example electronic device including projectors.

According to an embodiment, the screen 40 or the electronic device including the screen 40 may be configured to track the driver's gaze using at least one optical input device (e.g., a camera) such as an eye tracker (e.g., an eye tracker 130 of FIG. 3A or an eye tracker 230 of FIG. 4A). The screen 40 or the electronic device including the screen 40 may be configured to identify the position of the driver's gaze and change the position of the visual object 11 provided to the driver, when the driver gets in the vehicle, when the driver's posture within the vehicle changes, or when there is a change in the driver's gaze that looks at the outside. According to an embodiment, or the screen 40 or the electronic device including the screen 40 may perform calibration related to the gaze position to compensate for or reduce an error in the gaze position caused by the positional relationship.

In an embodiment, for performing the calibration, the screen 40 or the electronic device including the screen 40 may obtain calibration information related to the gaze position. The calibration information may include information related to calculation of the gaze position. For example, the calibration information may include at least one of an image and/or a video obtained using the eye tracker and/or a result of calculating the gaze position from the image and/or the video.

Figure 3B:
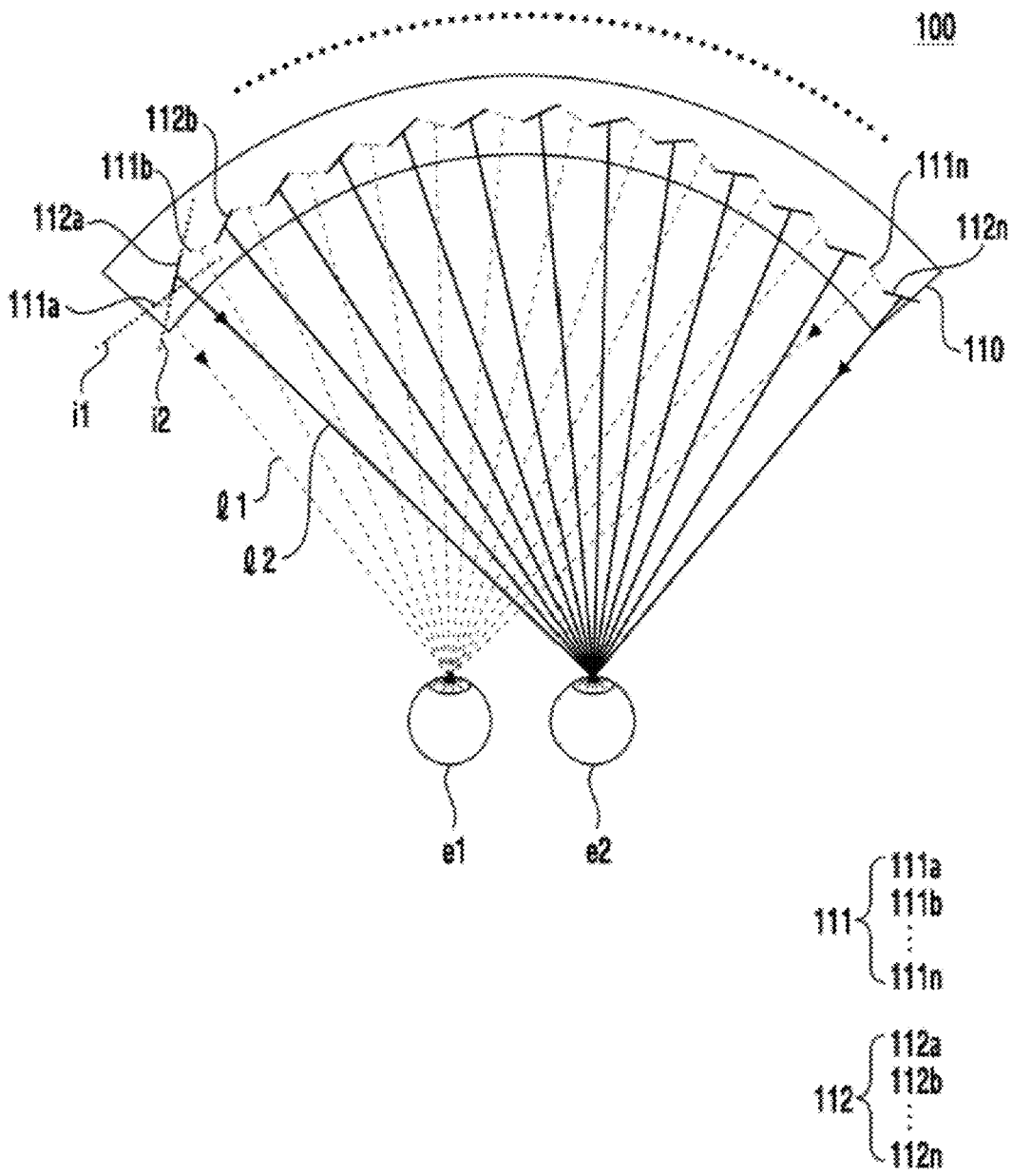
FIG. 3B illustrates a light path through which visual information is transmitted with light transmitted to eyes of a driver through components of an example electronic device.

FIG. 3A illustrates arrangement of components of an example electronic device. FIG. 3B illustrates a light path through which visual information is transmitted with light transmitted to eyes of a driver via components of an example electronic device;

Referring to FIGS. 3A and 3B, the electronic device 100 may include a screen 110 and an eye tracker 130. The electronic device 100 may be mounted in a vehicle. The electronic device 100 may be implemented as an electronic control unit (ECU) installed in a vehicle. The screen 110 may operate as a display for providing visual information to a user. The screen 110 may serve as at least a portion of a windshield of the vehicle (e.g., the vehicle 1 of FIG. 1). For example, the screen 110 may be disposed adjacent to the windshield of the vehicle (e.g., the vehicle 1 of FIG. 1) or may be embedded into the windshield. The screen 110 may be referred to as a head-up display.

According to an embodiment, the screen 110 may operate as a transparent display. For example, a first light emitting module 111 and a second light emitting module 112 disposed in the screen 110 may include light emitting elements such as a transparent organic light emitting diode (OLED). The screen 110 may be configured to provide the user with an image formed by light emitted from the first light emitting module 111 and the second light emitting module 112. The screen 110 operating as a transparent display may transmit light outside the vehicle 1 to an inside of the vehicle 1. The image by the light emitted from the first light emitting module 111 and the second light emitting module 112 may be displayed to overlap the external environment by the light transmitted into the vehicle 1 through the screen 110 operating as the transparent display. The first light emitting module 111 and the second light emitting module 112 may include a flexible and transparent substrate. For example, the first light emitting module 111 and the second light emitting module 112 may include a substrate formed of a transparent and flexible polymer (e.g., polyimide (PI)) on which a plurality of light emitting elements are disposed. The first light emitting module 111 and the second light emitting module 112 may include a substrate having transparency, so that light transmitted from the outside of the vehicle may be transmitted to a driver p of the vehicle 1. As the first light emitting module 111 and the second light emitting module 112 have flexibility, they may be disposed on a curved surface of the windshield 101.

The electronic device 100 may provide different images to each of both eyes of the driver p through the screen 110 so that the driver p feels a three-dimensional effect. The first light emitting module 111 and the second light emitting module 112 may be configured to provide visual information toward the eyes e of the driver p. The first light emitting module 111 may be configured to provide visual information (e.g., the first image 30*a* of FIG. 2) to the first eye e1 of the driver p, and the second light emitting module 112 may be configured to provide visual information (e.g., the second image 30*b* of FIG. 2) to the second eye e2 of the driver p. The first light emitting module 111 and the second light emitting module 112 may include a plurality of light emitting elements (111*a*, 111*b*, . . . , 111*n*, 112*a*, 112*b*, . . . , 112*n*). The screen 110 may include inclined surfaces (i1, i2) on which the plurality of light emitting elements (111*a*, 111*b*, . . . , 111*n*, 112*a*, 112*b*, . . . , 112*n*) are arranged to provide different images to both eyes of the user by the plurality of light emitting elements (111*a*, 111*b*, . . . , 111*n*, 112*a*, 112*b*, . . . , 112*n*). The inclined surfaces (i1, i2) may have an inclination with respect to an outer surface of the screen 110. A first inclined surface i1 having a first slope and a second inclined surface i2 having a second slope may be alternately disposed. The first inclined surface i1 may be inclined toward the first eye e1 of the driver p, and the second inclined surface i2 may be inclined toward the second eye e2 of the driver p.

According to an embodiment, the first light emitting module 111 may include a plurality of first light emitting elements (111*a*, 111*b*, . . . , 111*n*). Each of the plurality of first light emitting elements (111*a*, 111*b*, . . . , 111*n*) may be configured to emit light toward the first eye e1 of the driver p. The plurality of first light emitting elements (111*a*, 111*b*, . . . , 111*n*) of the first light emitting module 111 may be disposed on an inclined surface to face the first eye e1 of the driver p. For example, the plurality of first light emitting elements (111*a*, 111*b*, . . . , 111*n*) may be disposed on the first inclined surface i1. The first inclined surface i1 may be inclined to face the first eye e1 of the driver p within the screen 110. The first inclined surface i1 may have a first inclination with respect to an outer surface of the screen 110. The first light emitting elements (111*a*, 111*b*, . . . , 111*n*) disposed on the first inclined surface i1 may emit light toward the first eye e1 of the driver p. The first light emitting elements (111*a*, 111*b*, . . . , 111*n*) may form several pixels on each first inclined surface i1. The first light emitting elements (111*a*, 111*b*, . . . , 111*n*) may correspond to sub-pixels making up a pixel and may be configured to emit red light, blue light, or green light. Some of the plurality of first light emitting elements (111*a*, 111*b*, . . . , 111*n*) disposed on one first inclined surface i1 may provide a portion of the first image (e.g., the first image 30*a* of FIG. 2) to the first eye e1 of the driver p. The plurality of first light emitting elements (111*a*, 111*b*, . . . , 111*n*) disposed on the entire first inclined surface i1 may provide the first image to the first eye e1 of the driver p.

The second light emitting module 112 may include a plurality of second light emitting elements (112a, 112b, 112n). Each of the plurality of second light emitting elements (112a, 112b, . . . , 112n) may be configured to emit light toward the second eye e2 of the driver p. The plurality of second light emitting elements (112a, 112b, . . . , 112n) of the second light emitting module 112 may be disposed on an inclined surface to face the second eye e2 of the driver p. For example, the plurality of second light emitting elements (112a, 112b, . . . , 112n) may be disposed on the second inclined surface i2. The second inclined surface i2 may be inclined to face the second eye e2 of the driver p in the screen 110. The second inclined surface i2 may have a second inclination with respect to an outer surface of the screen 110. The second light emitting elements (112a, 112b, . . . , 112n) disposed on the second inclined surface i2 may emit light toward the second eye e2 of the driver p. The second light emitting elements (112a, 112b, . . . , 112n) may form several pixels on each second inclined surface i2. The second light emitting elements (112a, 112b, . . . , 112n) may correspond to sub-pixels making up a pixel and may be configured to emit red light, blue light, or green light. Some of the plurality of second light emitting elements (112a, 112b, . . . , 112n) disposed on one second inclined surface i2 may provide a portion of the second image (e.g., the second image 30b of FIG. 2) to the second eye e2 of the driver p. The plurality of second light emitting elements (112a, 112b, . . . , 112n) disposed on the entire second inclined surface i2 may provide the second image to the second eye e2 of the driver p.

The first light emitting module 111 and the second light emitting module 112 may be configured to adjust a distance between the visual object 11 on the virtual screen (e.g., the virtual screen 10 of FIG. 2) provided through the screen 110 and the user p, based on a binocular parallax between the first visual object 11a in the first image (e.g., the first image 30a of FIG. 2) provided from the first light emitting module 111 to the first eye e1 of the driver p and the second visual object 11b in the second image (e.g., the second image 30b of FIG. 2) provided from the second light emitting module 112 to the second eye e2 of the driver p. For example, the electronic device 100 may increase or decrease the binocular parallax by adjusting the positions of the first visual object in the first image and the second visual object in the second image provided from the first light emitting module 111.

According to an embodiment, the eye tracker 130 may include at least one optical input device (e.g., a camera) configured to track the driver's gaze. In order to provide visual information (e.g., the visual object 11 of FIG. 1) to the user, the electronic device 100 may adjust the posture of the first light emitting module 111 and/or the second light emitting module 112, based on information obtained through the eye tracker 130. The electronic device 100 may detect the position of the eye e of the driver p of the vehicle 1 or a focal position (or focal length) of the eye through the eye tracker 130. The electronic device 100 may control the posture of the first light emitting module 111 and/or the second light emitting module 112, based on the position of the eye e obtained through the eye tracker 130. By controlling the posture of the first light emitting module 111 and/or the second light emitting module 112, the image provided from the first light emitting module 111 and the second light emitting module 112 may be transmitted to the eye e of the driver p. The posture of the first light emitting module 111 and the second light emitting module 112 may be adjusted by changing or tilting a vertical inclination and/or a horizontal inclination of the inclined surfaces (i1, i2). For example, the inclined surfaces (i1, i2) may be separated from each other. The inclination of each of the inclined surfaces (i1, i2) may be adjusted by an actuator. The electronic device 100 may adjust the light paths (l1, l2) of light emitted from the plurality of light emitting elements (111a, 111b, . . . 111n, 112a, 112b, . . . 112n) disposed on the inclined surfaces (i1, i2), of which inclination is adjusted by the actuator, so as to face the eye e of the driver p. For example, when the distance between the driver p and the screen 110 increases, the slope of the first inclined surface i1 and the slope of the second inclined surface i2 may be reduced to move the meeting point of the light paths (l1, l2) to the eye e of the driver p. When the distance between the driver p and the screen 110 becomes closer, the slope of the first inclined surface i1 and the slope of the second inclined surface i2 may be increased to move the meeting point of the light paths (l1, l2) to the eye e of the driver p.

Figure 4B:
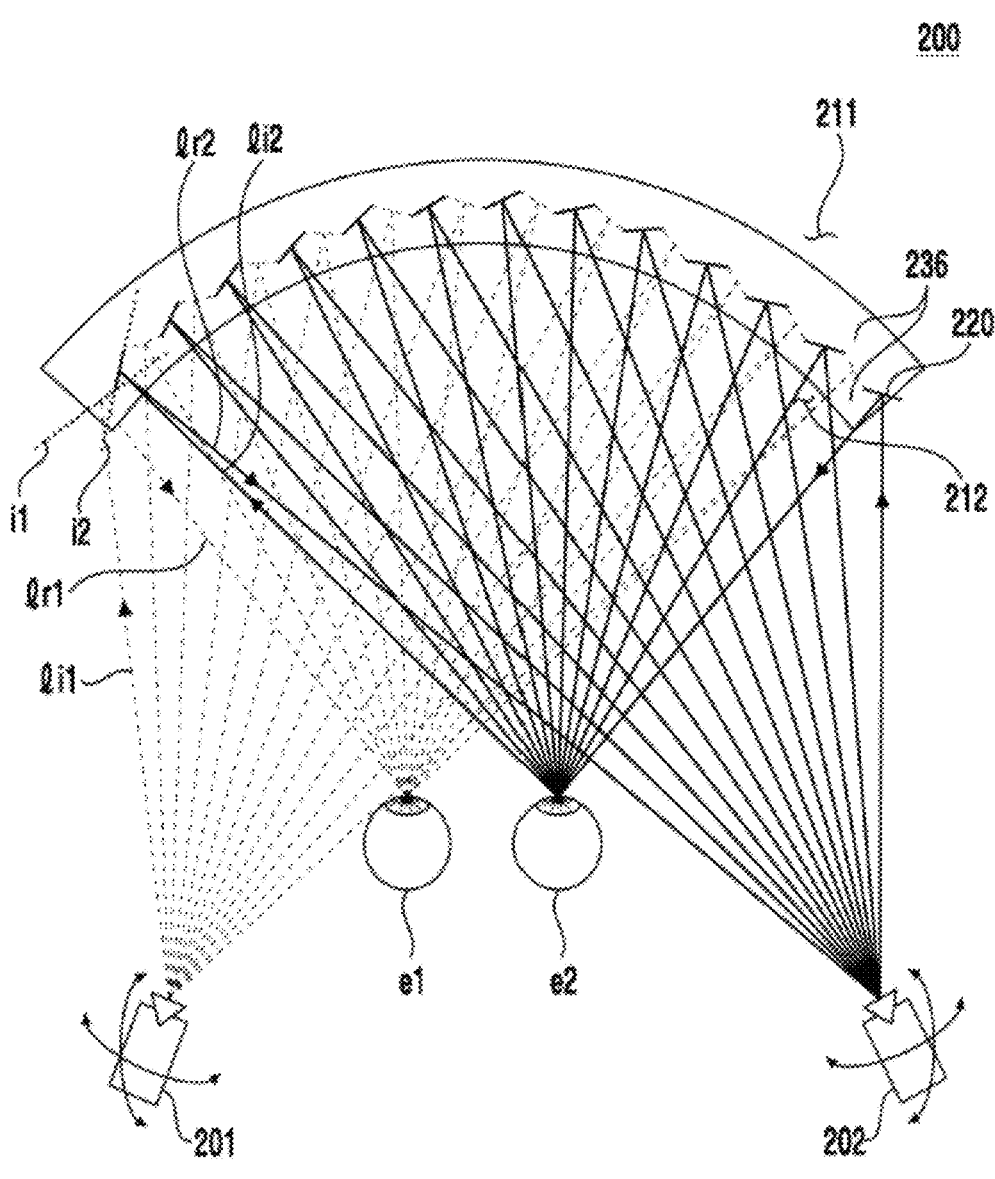
FIG. 4B illustrates a light path through which visual information is transmitted with light transmitted to eyes of a driver through components of an example electronic device including projectors.

FIG. 4A illustrates an arrangement of components of an example electronic device including projectors. FIG. 4B illustrates a light path through which visual information is transmitted with light transmitted to eyes of a driver via components of an example electronic device including projectors;

Referring to FIGS. 4A and 4B, the electronic device 200 may include a first light emitting module 201, a second light emitting module 202, a screen 210, and an eye tracker 230. The electronic device 200 may be implemented as an electronic control unit (ECU) included in a vehicle. The first light emitting module 201, the second light emitting module 202, and the screen 210 may operate as a display for presenting visual information to a user.

The first light emitting module 201 and the second light emitting module 202 may be configured to adjust the focal length between the image displayed on the virtual screen (e.g., the virtual screen 10 of FIG. 1) and the eye e of the driver p, based on the position of the user's eye obtained through the eye tracker 230 (e.g., the eye tracker 130 of FIG. 3A). The eye tracker 230 may be substantially the same as or similar to the eye tracker 130 of FIG. 3A. The first light emitting module 201 may be spaced apart from the second light emitting module 202. The first light emitting module 201 and the second light emitting module 202 may include a plurality of hardware components assembled to emit light (or light beam) representing pixels arranged in two dimensions. The methods in which the first light emitting module 201 and the second light emitting module 202 emit light may include, for example, a digital light processing (DLP), a liquid crystal on silicon (LCOS) technique, a 3LCD (Liquid Crystal Display) method, an LCD method, and/or a laser method.

For example, the first light emitting module 201 and the second light emitting module 202 may include cathode-ray tubes (CRTs) for emitting light of each of three primary colors in a color space, and a combination of lenses for enlarging light emitted from each of the CRTs. For example, the first light emitting module 201 and the second light emitting module 202 implemented by the 3LCD method may include a light source (e.g., a lamp) for emitting light, optical filters for splitting the light into light paths corresponding to each of three primary colors, liquid crystal display (LCD) panels disposed in each of the light paths, and a combination of a prism and/or lenses for synthesizing light output from the LCD panels. For example, the first light emitting module 201 and the second light emitting module 202 implemented by the DLP method may include a combination of a light source for emitting light, an optical filter for selecting any one of three primary colors from the light, a digital mirror device (DMD) for adjusting reflection on the primary color filtered by the optical filter, and a combination of lenses for magnifying light reflected by the DMD. For example, the first light emitting module 201 and the second light emitting module 202 implemented by the laser method may include a light source for emitting laser light, an optical filter, an actuator for adjusting a light path of laser light filtered by the optical filter, and a combination of hardware components for reducing interference of laser light such as speckle. In view of requiring projection of light for displaying on a screen, the light emitting module of at least one of the above-described combinations may be referred to as a projection assembly or a beam projector. The first light emitting module 201 and the second light emitting module 202 may be respectively configured as a separate component and may be disposed on a dashboard of a vehicle, a driver's seat of the vehicle, or a cabin ceiling of the vehicle. The first light emitting module 201 and the second light emitting module 202 may be disposed in a cabin of the vehicle capable of emitting light toward the screen 210 mounted in the windshield.

The screen 210 may be spaced apart from the first light emitting module 201 and the second light emitting module 202. The screen 210 may be disposed adjacent to a windshield of the vehicle (e.g., the vehicle 1 of FIG. 1) or may be embedded into the windshield. The screen 210 may cause light emitted from the first light emitting module 201 and the second light emitting module 202 to be reflected to transmit visual information to the driver p. For example, the first light emitting module 201 and the second light emitting module 202 may emit light to the screen 210 along an incident light path li. The light transmitted to the screen 210 may be reflected by a film 220 in the screen 210. The light reflected by the film 220 in the screen 210 may be transmitted to the eye e of the driver p along a reflected light path lr. The film 220 may include a flexible and transparent material. The screen 210 may have a transparent and flexible film 220, thereby transmitting the light transmitted from the outside of the vehicle 1 to the driver of the vehicle 1. Owing to the film 220 having flexibility, the film 220 may be disposed on a curved windshield 101 of the vehicle.

An apparatus including the first light emitting module 201, the second light emitting module 202, and the screen 210 may be referred to as a head-up display in terms of displaying information on a windshield (or front glass) of a vehicle.

According to an embodiment, the screen 210 may be formed by double laminating. For example, the screen 210 may include a first transparent layer 211, a second transparent layer 212, a film 220, a first bonding material 221, and a second bonding material 222. The first transparent layer 211 and the second transparent layer 212 may include a transparent material to allow the driver to view an external environment while maintaining rigidity of the windshield as required. The first transparent layer 211 and the second transparent layer 212 may include tempered glass, glass, or a polymer material. The first transparent layer 211 may be spaced apart from the second transparent layer 212. The first transparent layer 211 and the second transparent layer 212 may define an inner space or an inner volume of the screen 210. The film 220 may be disposed in the inner space or the inner volume. For example, the film 220 may be disposed between the first transparent layer 211 and the second transparent layer 212. The film 220 may be configured to reflect light emitted from the first light emitting module 201 and the second light emitting module 202. The film 220 may have a wrinkled surface. For example, the film 220 may include a first inclined surface i1 and a second inclined surface i2. The first inclined surface i1 and the second inclined surface i2 may be alternately and repeatedly arranged.

The first inclined surface i1 may be configured to cause light emitted from the first light emitting module 201 to be reflected to the first eye e1 of the driver p. The second inclined surface i2 may be configured to cause light emitted from the second light emitting module 202 to be reflected to the first eye e2 of the driver p.

According to an embodiment, the electronic device 200 may provide different images to each of both eyes of the driver p so as to provide the driver p with a sense of three-dimensionality. The first light emitting module 201, the second light emitting module 202, and the film 220 may be configured to provide visual information toward the eye e of the driver p. The first light emitting module 201 may be configured to provide visual information (e.g., the first image 30a of FIG. 2) to the first eye e1 of the driver p through light reflected from the first inclined surface i1 of the film 220. The second light emitting module 202 may be configured to provide visual information (e.g., the second image 30b of FIG. 2) to the second eye e2 of the driver p through light reflected from the second inclined surface i2 of the film 220. The inclined surfaces (i1, i2) may have an inclination with respect to the outer surface of the screen 110. The first inclined surface i1 having the first inclination and the second inclined surface i2 having the second inclination may be arranged in an alternate manner. The first inclined surface i1 may be inclined toward the first eye e1 of the driver p, and the second inclined surface i2 may be inclined toward the second eye e2 of the driver p. The first inclined surface i1 may have a first inclination with respect to an outer surface of the screen 210. The second inclined surface i2 may have a second inclination with respect to an outer surface of the screen 210.

According to an embodiment, the first light emitting module 201 may emit light to the first inclined surface il. For example, the first light emitting module 201 may emit light along the first incident light path $li_1$. The first inclined surface il inclined to face the first eye e1 of the driver p may cause the incident light to be reflected to the first eye e1 of the driver p along the first reflected light path $lr_1$. The light reflected by one first inclined surface il may provide a portion of the first image (e.g., the first image 30a of FIG. 2) to the first eye e1 of the driver p. The light reflected from the entire first inclined surface il may provide the first image to the first eye e1 of the driver p.

According to an embodiment, the second light emitting module 202 may emit light to the second inclined surface i2. For example, the second light emitting module 202 may emit light along the second incident light path $li_2$. The second inclined surface i2 inclined to face the second eye e2 of the driver p may cause the incident light to be reflected to the second eye e2 of the driver p along the second reflected light path $lr_2$. The light reflected from one second inclined surface i2 may provide a portion of the second image (e.g., the second image 30b of FIG. 2) to the second eye e2 of the driver p. The light reflected from the entire second inclined surface i2 may provide the second image to the second eye e2 of the driver p.

The electronic device 200 may be configured to adjust the distance of the visual object provided through the screen 210, based on adjusting the binocular parallax through the first light emitting module 201 and the second light emitting module 202. For example, the first light emitting module 201 and the second light emitting module 202 may be configured to adjust the distance between and the user p and the visual object 11 on the virtual screen (e.g., the virtual screen 10 of FIG. 2) provided through the screen 210, based on the binocular parallax between the first visual object 11$a$ within the first image (e.g., the first image 30$a$ of FIG. 2) provided from the first light emitting module 201 to the first eye e1 of the driver p along the first incident light path li$_1$ and the first reflected light path lr$_i$ and the second visual object 11$b$ within the second image (e.g., the second image 30$b$ of FIG. 2) provided from the second light emitting module 112 to the second eye e2 of the driver p along the second incident light path li$_2$ and the second reflected light path lr$_2$. For example, the electronic device 200 may increase or decrease the binocular parallax by adjusting the positions of the first visual object within the first image provided from the first light emitting module 201 and the second visual object within the second image provided from the second light emitting module 202. The image in which the light emitted from the first light emitting module 201 and the second light emitting module 202 is reflected by the film may be displayed to overlap the external environment by the light transmitted into the vehicle 1 through the screen 110.

According to an embodiment, the electronic device 200 may control the posture of the first light emitting module 201 and/or the second light emitting module 202, based on the position of the eye e of the driver p obtained through the eye tracker 230. The electronic device 200 may control the posture of the first light emitting module 201 and/or the second light emitting module 202 to transmit images provided from the first light emitting module 201 and the second light emitting module 202 to the eye e of the driver p. The posture of the first light emitting module 201 and the second light emitting module 202 may be adjusted by an actuator coupled to the first light emitting module 201 and the second light emitting module 202. The actuator may be configured to perform adjustment of a distance of the light emitting modules (201, 202) up to the screen and/or adjustment of an up/down or left/right rotation (or tilting) of each of the light emitting modules (201, 202).

When the position of the eye e of the driver p obtained through the eye tracker 230 is far from the screen 210, the electronic device 200 may move the light emitting modules (201, 202) away from the screen 210. The light emitting modules (201, 202) located away from the screen 210 may emit light at a narrow incident angle toward the film 220 of the screen 210. The light emitted at the narrow incident angle may be reflected by the film 220 of the screen 210 at such a narrow reflection angle. The meeting point of the reflected light paths (LR1, LR2) where the reflected light travels with a narrow angle of reflection may be far apart. The electronic device 100 may adjust the reflected light paths (lr$_1$, lr$_2$) to face the eye e of the driver p by adjusting the positions of the light emitting modules (201, 202).

In order to provide visual information (e.g., the visual object 11 of FIG. 1) to the user, the electronic device 200 may move the light emitting modules (201, 202) closer to the screen 210, when the position of the eye e of the driver p obtained through the eye tracker 230 is close to the screen 210. The light emitting modules (201, 202) that are close to the screen 210 may emit light at a wide incident angle toward the film 220 of the screen 210. The light emitted at such a wide incident angle may be reflected by the film 220 of the screen 210 at a wide reflection angle. The meeting points of the reflected light paths (lr$_1$, lr$_2$) through which the light reflected at a wide reflection angle travels may be closer. The electronic device 200 may adjust the reflected light paths (lr1, lr2) to face the eye e of the driver p by adjusting the positions of the light emitting modules (201, 202).

As in the inclined surfaces (i1, i2) of FIG. 3B, the inclined surfaces (i1, i2) may be separated from each other for their inclination to be adjusted. As in the operation of FIG. 3B, the electronic device 200 may be configured such that light is reflected by the inclined surfaces (i1, i2) and travels toward the eye e of the driver p along the reflected light paths (lr1, lr2), based on the position of the eye e of the driver p identified through the eye tracker 230.

The screen 210 may transmit light outside the vehicle 1 to an interior of the vehicle 1. To reduce visibility of the film 220 disposed within the screen 210 to the driver p, the film 220 may be formed of a transparent material. The film 220 may have a refractive index different from that of the second transparent layer 212 for reflection of light transmitted through the second transparent layer 212. In order to reduce visibility of the film 220 by the driver p due to such a different refractive index, a refractive index matching material 236 may be filled between the first transparent layer 211 and the second transparent layer 212. The refractive index matching material 236 may compensate for a difference between the refractive index of the film 220 and the refractive index of the second transparent layer 212. The refractive index matching material 236 may be replaced with an anti-reflection material or an anti-reflection film.

The first bonding material 221 may be applied to one surface of the first transparent layer 211 facing the film 220. The first bonding material 221 may couple the first transparent layer 211 and the refractive index matching material 236. When another material for preventing the film 220 from being visible is filled between the first transparent layer 211 and the second transparent layer 212, the first bonding material 221 may be used to couple the another material with the first transparent layer 211. The second bonding material 222 may be applied to one surface of the second transparent layer 212 facing the film 220. The second bonding material 222 may couple the second transparent layer 212 and the refractive index matching material 236. When another material for preventing the film 220 from being visible is filled between the first transparent layer 211 and the second transparent layer 212, the second bonding material 222 may be used to couple the another material and the second transparent layer 212. The first bonding material 221 and the second bonding material 222 may include polyvinyl-butyral.

Figure 5:
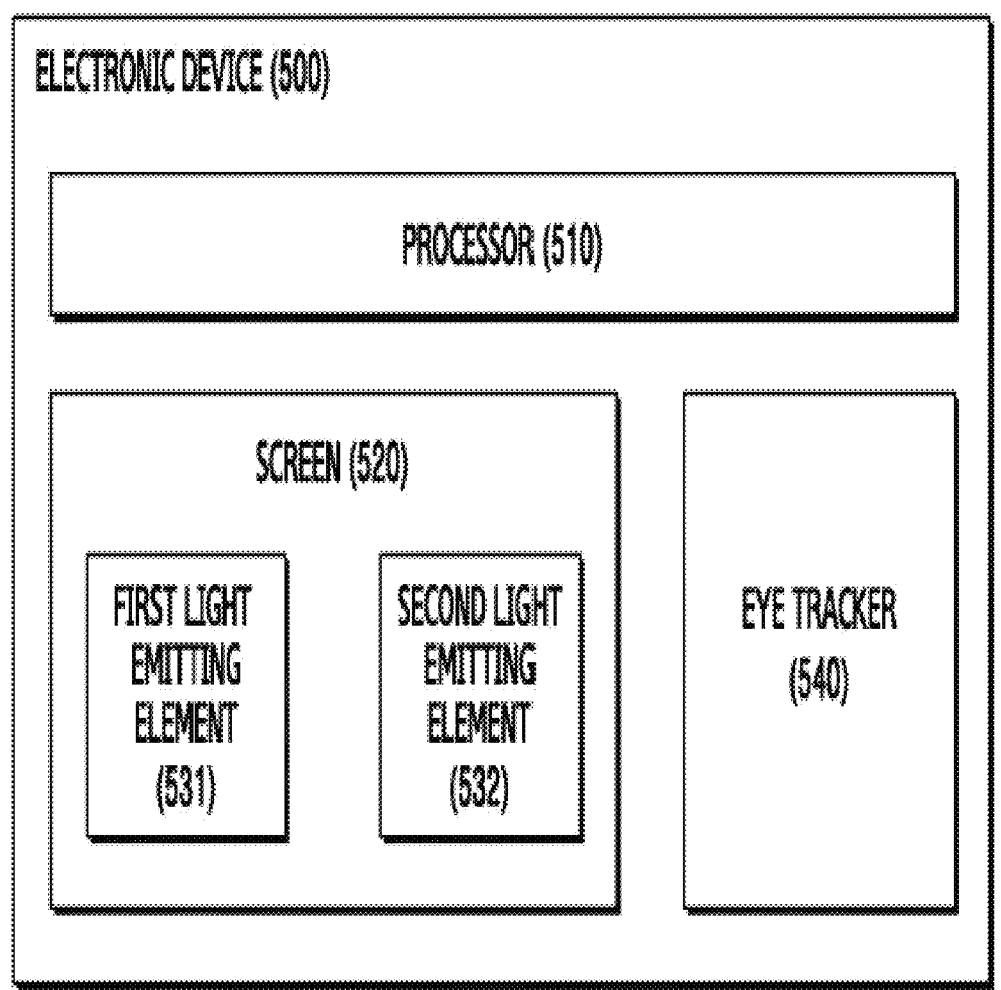
FIG. 5 is a block diagram of an example electronic device mounted on a vehicle.

FIG. 5 illustrated a block diagram of an example electronic device mounted on a vehicle.

Referring to FIG. 5, an electronic device 500 (e.g., the electronic device 100 of FIG. 3A and/or the electronic device 200 of FIG. 4A) may include a processor 510, a screen 520 (e.g., the screen 110 of FIG. 3A and/or the screen 210 of FIG. 4A), a first light emitting element 531 (e.g., the first light emitting element 111 of FIG. 3B or the first light emitting element 201 of FIG. 4B), a second light emitting element 532 (e.g., the second light emitting element 112 of FIG. 3B or the second light emitting element 202 of FIG. 4B), and/or an eye tracker 540 (e.g., the eye tracker 130 of FIG. 3A or the eye tracker 230 of FIG. 4A).

The processor 510, the first light emitting element 531, the second light emitting element 532, and/or the eye tracker 540 may be electrically and/or operatively connected to each other. Such an operative coupling of each element may represent a direct connection or an indirect connection.

According to an embodiment, the processor 510 of the electronic device 100 may include hardware for processing data based on one or more instructions. The hardware for processing data may include, for example, an arithmetic and logic unit (ALU), a floating point unit (FPU), a field programmable gate array (FPGA), a central processing unit (CPU), and/or an application processor (AP). The number of processors 510 may be one or more. For example, the processor 510 may have a structure of a multi-core processor such as a dual-core, a quad-core, or a hexa-core.

The screen 520 may be configured to output visual information to a driver of a vehicle. For example, the screen 520 may provide the user with one or more images or videos provided from the processor 510 of the electronic device 500. The screen 520 may be configured to provide a visual object to the driver of the vehicle. The visual object may represent an object displayed on the screen 520 for transmitting and/or interacting with information, such as a text, an image, an icon, a video, a slider, and/or a table including information related to the vehicle. The screen 520 may include a first light emitting element 531 and a second light emitting element 532. The first light emitting element 531 and the second light emitting element 532 may form pixels disposed in the screen 520. An image provided through the first light emitting element 531 may be transmitted to one eye (e.g., the left eye) of the driver, and an image provided through the second light emitting element 532 may be transmitted to another eye (e.g., the right eye) of the driver. The screen 520 may provide an image including a visual object having a three-dimensional effect, based on a binocular parallax between images provided through the first light emitting element 531 and the second light emitting element 532.

The eye tracker 540 of the electronic device 500 according to an embodiment may include a camera. The eye tracker 540 may include at least one optical sensor (e.g., a charged coupled device (CCD) sensor or a complementary metal oxide semiconductor (CMOS) sensor) for generating an electrical signal indicating a color and/or brightness of light. A plurality of optical sensors included in the eye tracker 540 may be arranged in the form of a two-dimensional array. The eye tracker 540 may obtain an electrical signal of each of the plurality of optical sensors substantially simultaneously to generate images or frames corresponding to light reaching the optical sensors of the two-dimensional array and including a plurality of pixels arranged in a two-dimensional array. For example, the video obtained using the eye tracker 540 may refer to a sequence of a plurality of images obtained from the eye tracker 540 at a specified frame rate. The eye tracker 540 may further include a flashlight disposed toward a direction in which light is received, and outputting the light in the direction. The eye tracker 540 may obtain a video including the driver or the interior of the vehicle.

The electronic device 500 according to an embodiment of the disclosure may further include a camera different from the eye tracker 540. The camera may further include a flashlight that is disposed toward the direction in which light is received and outputs the light in the direction. For example, the electronic device 500 may obtain a video including the external environment of the vehicle through the camera. However, the disclosure is not limited thereto.

Figure 6:
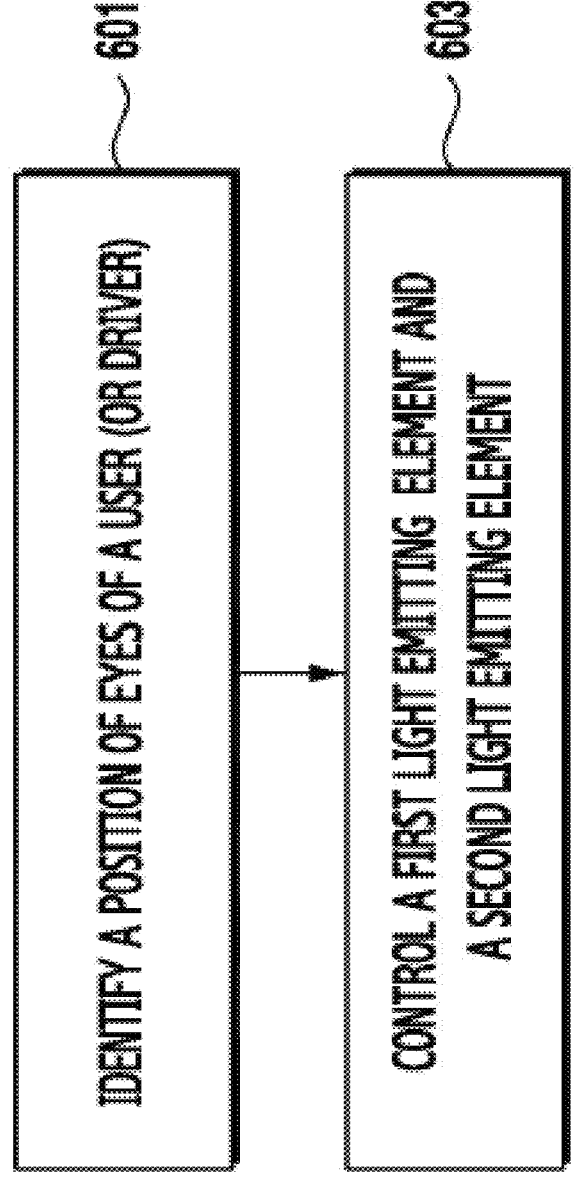
FIG. 6 is a flowchart illustrating an example of an operation of an electronic device.

FIG. 6 is a flowchart illustrating an operation of an electronic device.

Referring to FIG. 6, in operation 601, a processor 510 (e.g., the processor 510 of FIG. 5) may be configured to identify a position of an eye of a user (or a driver or a passenger). The processor 510 may identify the position of the user's eye through an eye tracker (e.g., the eye tracker 540 of FIG. 5). The eye tracker 540 may obtain an image of the driver's eyes by photographing a surrounding environment of the driver. The eye tracker 540 may include a plurality of cameras. The plurality of cameras may capture the surrounding environment of the driver at various angles. The processor 510 may identify the position of the driver and the position of the driver's eyes from the captured images.

The position of the eye may mean a position of the eye on spatial coordinates stored in the electronic device 500. The processor 510 may be configured to obtain focal length information identified based on a direction in which the eyes gaze or a size and direction of the pupil or iris from the captured images. The processor 510 may identify coordinates, a focal length, and a gaze direction of the eyes of the driver from the image information related to the eyes of the driver.

In operation 603, the processor 510 may be configured to control the first light emitting element (e.g., the first light emitting elements (111*a*, 111*b*, . . . , 111*n*) of FIG. 3B and/or the first light emitting module 201 of FIG. 4B) and the second light emitting element (e.g., the second light emitting elements (112*a*, 112*b*, . . . , 112*n*) of FIG. 3B and/or the second light emitting module 202 of FIG. 4B), based on the identified coordinates, focal length, and gaze direction of the eyes of the driver.

According to an embodiment, the processor 510 may identify that the position of the driver's eyes is moved from the first position to the second position using the eye tracker 540. The processor 510 may be configured to adjust the angles of the first light emitting element (or the first light emitting module) and the second light emitting element (or the second light emitting module), such that an end point of the path of light transmitted from the first light emitting element (or the first light emitting module) and the second light emitting element (or the second light emitting module) is moved from the first position to the second position, based on the identified position of the driver's eyes.

According to an embodiment, the processor 510 may be configured to adjust the position of the visual object within the virtual screen, by controlling the first light emitting module and the second light emitting module based on the identified focal length. For example, in order to adjust the position of the visual object, the processor 510 may control the posture of the first light emitting module and the second light emitting module. As another example, in order to adjust the position of the visual object, the processor 510 may be configured to adjust the position of the visual object in the first image provided through the first light emitting module and the position of the visual object in the second image provided through the second light emitting module. The processor 510 may adjust the binocular parallax by adjusting the position of the visual object in the first image and the position of the visual object in the second image. The driver may detect that the position of the visual object approaches or moves away through the adjusted binocular parallax.

According to an embodiment, the processor 510 may obtain an image through an external camera (or a front camera) of the vehicle, and based on the position of the identified eye, identify a visual object corresponding to an external object at which the user gazes, among the visual objects obtained through the front camera. The processor 510 may identify a focal length between the external object and the user, based on the identified visual object. In contrast to the above method, the processor 510 may identify a focal length based on the identified position of the eye, and identify the external object located at the focal length based on the identified focal length. The processor 510 may be configured to provide the image information including the visual object around the external object located at the focal length (or the external object at which that the user gazes) based on the identified focal length or the position of the eye. The processor 510 may be configured to control the posture of the first light emitting element (or the first light emitting module) and the second light emitting element (or the second light emitting module) or to adjust the position of the visual object within the image provided from the first light emitting element (or the first light emitting module) and the second light emitting element (or the second light emitting module). The image information transferred through the visual object or the image may include information selected from at least one of driving direction, driving distance, remaining distance, travelling route, surrounding location information, or a combination thereof.

An electronic device according to the above-described embodiment may include a first light emitting module, a second light emitting module, a screen and eye tracker. The screen may be configured to provide a user with an image using light emitted from the first light emitting module and the second light emitting module. The eye tracker may be configured to detect a position of eyes of the user. The first light emitting module and the second light emitting module are configured to adjust a focal length between the image and the eyes of the user, based on the position of the eyes of the user detected through the eye tracker.

According to an embodiment, the second light emitting module may be spaced apart from the first light emitting module. The screen spaced apart from the first light emitting module and the second light emitting module may include a first transparent layer, a second transparent layer and a film. The second transparent layer may be spaced apart from the first transparent layer. The film may be disposed between the first transparent layer and the second transparent layer and may be transparent with a wrinkled surface. The wrinkled surface may include a first inclined surface facing the first light emitting module and a second inclined surface facing the second light emitting module. The first inclined surface may be configured to reflect light emitted from the first light emitting module to be transmitted to a first eye of the user. The second inclined surface may be configured to reflect light emitted from the second light emitting module to be transmitted to a second eye of the user.

According to an embodiment, the screen may further include a refractive index matching material that fills a space between the first transparent layer and the second transparent layer. The refractive index matching material may compensate for a difference in refractive index between the film and the second transparent layer through which light reflected by the film passes.

According to an embodiment, the first light emitting module and the second light emitting module may be configured to emit light facing the film, such that the light reflected by the screen is transmitted to the user, when the user looks at the screen.

According to an embodiment, the first light emitting module and the second light emitting module may be configured to adjust a distance between the user and a visual object provided via the screen, based on a binocular parallax between a first visual object in a first image provided to the first eye of the user from the first light emitting module and a second visual object in a second image provided to the second eye of the user from the second light emitting module.

According to an embodiment, each of the first light emitting module and the second light emitting module may be configured to adjust a distance to the screen or to be tilted relative to the screen, so as to provide visual information to eyes of the user.

According to an embodiment, the screen may function as at least part of a windshield of a vehicle on which the electronic device is mounted.

According to an embodiment, the first light emitting module and the second light emitting module may function as a projection device providing an image through light reflected by the screen.

According to an embodiment, a layer within the screen may include a wrinkled surface and first light emitting elements of the first light emitting module and second light emitting elements of the second light emitting module may include transparent organic light emitting diodes (OLEDs), wherein the wrinkled surface may include first inclined surfaces on which the first light emitting elements are respectively disposed and facing a first eye of the user, and second inclined surfaces on which the second light emitting elements are respectively disposed and facing a second eye of the user.

According to an embodiment, the electronic device may further include an eye tracker configured to identify a position of eyes of the user, and a processor operatively connected to the eye tracker, the first light emitting module and the second light emitting module. The processor may be configured to control a posture of the first light emitting module and a posture the second light emitting module, based on the position of the eyes of the user obtained from the eye tracker.

According to an embodiment, the processor may be configured to identify that the position of the user's eyes is moved from a first position to a second position, using the eye tracker, and adjust angles of the first light emitting module and the second light emitting module to transmit light emitted from the first light emitting module and the second light emitting module and transmitted to the first position, to the second position.

According to an embodiment, the processor may be configured to control a posture of the first light emitting module and a posture of the second light emitting module, based on the focal length for changing a position of a virtual object provided through the screen.

According to an embodiment, the electronic device may further include a front camera configured to obtain an image related to an environment in front of the electronic device. The processor may be configured to identify, from visual objects obtained through the front camera, a visual object corresponding to an external object which the user is looking at, identify a focal length between the external object and the user's eye, based on the identified visual object, and adjust a posture of the first light emitting module and a posture of the second light emitting module to provide image information on the focal length, based on the identified focal length.

According to an embodiment, the processor may be configured to provide a first image, toward a first eye of the user, corresponding to the image information using the first light emitting module, provide a second image, toward a second eye of the user, corresponding to the image information using the second light emitting module, and provide the image information on the focal length, by adjusting a distance between a first virtual object in the first image and a second virtual object in the second image corresponding to the first image.

According to an embodiment, the image information may be selected from at least one of driving direction, driving distance, remaining distance, travelling route, surrounding location information, or a combination thereof.

According to an embodiment, polyvinyl butyral may be coated on a surface of the first transparent layer facing the film and a surface of the second transparent layer facing the film.

According to an embodiment, the first transparent layer and the second transparent layer may include glass or polymer materials.

According to an embodiment, an operating method of an electronic device may comprise identifying a position of eyes of a driver in a vehicle, emitting light toward a front windshield of the vehicle through a first light emitting module to transmit a first image toward a first eye of a driver, emitting light toward the front windshield of the vehicle through a second light emitting module to transmit a second image toward a second eye of the driver, and controlling a posture of the first light emitting module and the second light emitting module based on the identified position of eyes of the driver.

A focus of image information reflected by the front windshield of the vehicle may be adjusted by a binocular parallax between a first virtual object in the first image and a second virtual object in the second image.

According to an embodiment, the method may further comprise displaying the image information at a position corresponding to the focal length, by adjusting a distance between the first virtual object in the first image and the second virtual object in the second image.

According to an embodiment, the image information may be selected from at least one of driving direction, driving distance, remaining distance, travelling route, surrounding location information, or a combination thereof.

In a non-transitory computer-readable storage medium storing one or more programs according to an embodiment, the one or more programs may include instructions that, when executed by an electronic device, cause the electronic device to identify a position of an eye of a driver in a vehicle. The one or more programs may include instructions that, when executed by the electronic device, cause the electronic device to emit light toward the front glass of the vehicle through a first light emitting module in order to transmit a first image to a first eye of the driver. The one or more programs may include instructions that, when executed by the electronic device, cause the electronic device to emit light toward the front glass of the vehicle through a second light emitting module in order to transmit a second image to a second eye of the driver. The one or more programs may include instructions causing, when the electronic device is executed, the electronic device to control postures of the first light emitting module and the second light emitting module, based on the identified position of the driver's eye. The focus of the image information reflected by the front glass of the vehicle may be adjusted by a binocular parallax between the first virtual object in the first image and the second virtual object in the second image.

The above-described devices may be implemented as hardware components, software components, and/or a combination of hardware components and software components. For example, the devices and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may perform an operating system (OS) and one or more software applications performed on the operating system. Further, the processing device may access, store, manipulate, process, and generate data in response to the execution of the software. For convenience of understanding, it may be described that one processing device is used. However, those skilled in the art may understand that the processing device may include a plurality of processing elements and/or a plurality of types of processing elements. For example, the processing device may include a plurality of processors or one processor and one controller. In addition, other processing configurations such as parallel processors are also possible.

The software may include a computer program, a code, an instruction, or a combination of one or more thereof, and may configure a processing device to operate as desired or may independently or collectively command the processing device. Software and/or data may be interpreted by a processing device or may be embodied in any type of machine, component, physical device, computer storage medium, or device to provide a command or data to the processing device. Software may be distributed on a networked computer system and stored or executed in a distributed manner. Software and data may be stored in one or more computer-readable recording media.

The method according to an embodiment may be implemented in the form of program commands executable by various computer means and may be recorded on a computer-readable medium. In this case, the medium may continuously store a computer-executable program or temporarily store the program for execution or download. Further, the medium may be various recording means or storage means in which a single piece of hardware or a plurality of pieces of hardware are combined, and the medium is not limited to a medium directly connected to a computer system, and may be distributed on a network. Examples of the medium may include a magnetic medium such as a hard disk, a floppy disk, and a magnetic tape, an optical recording medium such as a compact disc read only memory (CD-ROM) and a digital versatile disc (DVD), a magneto-optical medium such as a floptical disk, and a read only memory (ROM), a random access memory (RAM), a flash memory, and the like, configured to store program instructions. Further, examples of other media may include recording media or storage media managed by an application store that distributes applications, a site that supplies or distributes various other software, a server, and the like.

Although the embodiments have been described with reference to the limited embodiments and drawings, it will be understood by those of ordinary skill in the art that various modifications and changes may be made thereto without departing from the spirit and scope of the disclosure. For example, even if the described techniques are performed in a different order from the described method, and/or components such as the described system, structure, device, circuit, or the like are combined or combined in a different form from the described method, or are replaced or substituted by other components or equivalents, appropriate results may be achieved.

Therefore, other implementations, other embodiments, and those equivalent to the scope of the appending patent claim also fall within the scope of the patent claim to be described later.

21

What is claimed is:

1. An electronic device, comprising:
a first light emitting module;
a second light emitting module;
a screen configured to provide a first image using light emitted from the first light emitting module and a second image using light emitted from the second light emitting module, to a user; and
an eye tracker configured to detect a position of eyes of the user; and
at least one processor operatively coupled to the first light emitting module, the second light emitting module, the screen, and the eye tracker, wherein the at least one processor is configured to:
identify, using the eye tracker, information indicating a focal length of the user;
based on a visual object to be displayed through the screen:
control the first light emitting module to display the visual object at a first position; and
control the second light emitting module to display the visual object at a second position different from the first position in accordance with the focal length,
wherein a position difference between the first position and the second position along a horizontal direction is determined to cause a binocular parallax of the visual object according to the focal length indicated by the information, and
wherein a distance of the visual object within a virtual screen for the user's recognition is changed by changing the first position and the second position, such that:
as the position difference between the first position and the second position increases, the binocular parallax of the visual object is increase; and
as the binocular parallax increases, the visual object within the virtual screen approaches to the user's recognition.

2. The electronic device of claim 1, wherein the second light emitting module is spaced apart from the first light emitting module,
wherein the screen spaced apart from the first light emitting module and the second light emitting module includes:
a first transparent layer;
a second transparent layer spaced apart from the first transparent layer; and
a transparent film disposed between the first transparent layer and the second transparent layer and including a wrinkled surface;
wherein the wrinkled surface includes a first inclined surface facing the first light emitting module and a second inclined surface facing the second light emitting module;
wherein the first inclined surface is configured to reflect light emitted from the first light emitting module to a first eye of the user;
wherein the second inclined surface is configured to reflect light emitted from the second light emitting module to a second eye of the user.

3. The electronic device of claim 2, wherein the screen further includes a refractive index matching material that fills a space between the first transparent layer and the second transparent layer, and
wherein the refractive index matching material compensates a difference in refractive index between the film and the second transparent layer through which light reflected by the film passes.

4. The electronic device of claim 2, wherein
the first light emitting module and the second light emitting module are configured to emit light facing the film such that the light reflected by the screen is transmitted to the user, when the user looks at the screen, and
the first transparent layer and the second transparent layer include glass or polymer materials.

5. The electronic device of claim 2, wherein a surface of the first transparent layer facing the film and a surface of the second transparent layer facing the film are coated by polyvinyl butyral.

6. The electronic device of claim 1, wherein the screen functions as at least part of a windshield of a vehicle on which the electronic device is mounted.

7. The electronic device of claim 1, wherein the first light emitting module and the second light emitting module function as a projection device providing an image through light reflected by the screen.

8. The electronic device of claim 1, wherein a layer within the screen includes a wrinkled surface,
wherein first light emitting elements of the first light emitting module and second light emitting elements of the second light emitting module include transparent organic light emitting diodes (OLEDs), and
wherein the wrinkled surface includes first inclined surfaces on which each of the first light emitting elements is disposed and facing a first eye of the user and second inclined surfaces on which each of the second light emitting elements is disposed and facing a second eye of the user.

9. The electronic device of claim 1, wherein the at least one processor is configured to control a posture of the first light emitting module and a posture the second light emitting module, based on the position of eyes of the user obtained from the eye tracker.

10. The electronic device of claim 9, wherein the processor is configured to:
identify whether a gaze position of the user is moved based on the position of the eyes of the user; and
based on identification that the gaze position of the user is moved, control the first light emitting module and the second light emitting module to change the position difference according to the focal length changed in association with the moved gaze position.

11. The electronic device of claim 9, wherein the processor is configured to control a posture of the first light emitting module and a posture of the second light emitting module, based on the focal length for changing a position of a virtual object provided through the screen.

12. The electronic device of claim 11, further comprising a front camera configured to obtain an image related to an environment in front of the electronic device,
wherein the processor is configured to:
identify, from visual objects obtained through the front camera, a visual object corresponding to an external object the user is looking at,
identify the focal length between the external object and eyes of the users, based on the visual object identified, and
adjust a posture of the first light emitting module and a posture of the second light emitting module to provide image information on the focal length, based on the focal length identified.

13. The electronic device of claim 12, wherein the processor is configured to:

provide a first image, toward a first eye of the user, corresponding to the image information using the first light emitting module, and provide a second image, toward a second eye of the user, corresponding to the image information using the second light emitting module, and provide the image information on the focal length, by adjusting a distance between a first virtual object in the first image and a second virtual object in the second image corresponding to the first image.

14. The electronic device of claim 12, wherein the image information is selected from at least one of driving direction, driving distance, remaining distance, travel path, surrounding location information, or a combination thereof.

15. The electronic device of claim 1, wherein each of the first light emitting module and the second light emitting module is configured to be tilted relative to the screen or adjust a distance to the screen, to provide visual information towards to the users.

16. The electronic device of claim 1, wherein the first light emitting module and the second light emitting module are configured to adjust a distance between the visual object provided from the screen and the user, based on binocular parallax between a first visual object in the first image provided to a first eye of the user from the first light emitting module and a second visual object in the second image provided to a second eye of the user from the second light emitting module.

17. A method of an electronic device including a first light emitting module, a second light emitting module, a screen configured to provide a first image using light emitted from the first light emitting module and a second image using light emitted from the second light emitting module, to a user, and an eye tracker configured to detect a position of eyes of the user, comprising:

identifying, using the eye tracker, information indicating a focal length of the user;

based on a visual object to be displayed through the screen:

controlling the first light emitting module to display the visual object at a first position;

controlling the second light emitting module to display the visual object at a second position different from the first position in accordance with the focal length, wherein a position difference between the first position and the second position along a horizontal direction is determined to cause a binocular parallax of the visual object according to the focal length indicated by the information, and wherein a distance of the visual object within a virtual screen for the user's recognition is changed by changing the first position and the second position, such that:

as the position difference between the first position and the second position increases, the binocular parallax of the visual object is increase; and as the binocular parallax increases, the visual object within the virtual screen approaches to the user's recognition.

18. The method of claim 17, further comprising displaying image information including the visual object, at the position corresponding to the focal length, by adjusting a distance between the first virtual object in the first image and the second virtual object in the second image.

* * * * *